Patented May 21, 1929.

1,713,825

UNITED STATES PATENT OFFICE.

FRANK GARACA, OF BESSEMER, ALABAMA, ASSIGNOR TO LUTHY RESEARCH LABORATORY, A CORPORATION OF TEXAS.

PROCESS OF MANUFACTURING SECONDARY-BATTERY PLATES.

No Drawing. Application filed November 18, 1927. Serial No. 234,293.

My invention relates to secondary electric batteries, more particularly to a method of manufacturing pasted plates for such batteries, and has for its object the provision of a method of the character designated by means of which plates may be economically produced and have a relatively long useful life.

A further object of my invention is the provision of a method of manufacture of pasted secondary battery plates which shall be effective to eliminate impurities in the paste, after being placed on its supporting grids.

Another object of my invention is the provision of a method of manufacturing pasted secondary battery plates from active materials recovered from used batteries and which shall purify such materials in the process of making the plates and render the plates reliable and efficient.

A still further object of my invention is to provide a step, in the manufacturing of secondary battery plates, for electrolytically separating sulphates, acetates, iron and other impurities present in active materials recovered from used batteries, and employed in making the plates.

As is well known in the art to which my invention relates, lead oxides employed in the manufacture of battery plates, to obtain the best results and longest life for the battery, must be as free from impurities as possible. To this end, great care is taken in the production of such lead for battery manufacture to eliminate impurities. In the grinding of such lead, preparatory to forming it into a paste before placing it on the supporting grids, small particles of metal from the grinding apparatus are necessarily carried into the powdered lead and these particles of metal have a detrimental effect on the life of the battery.

It has heretofore been proposed to utilize active materials recovered from used secondary battery plates in the manufacture of new battery plates. For example, the U. S. patent to Silvey, No. 562,776, sets forth a method of utilizing the worn out positive plates with the active material therein and subjects such plates, first, to washing, to free them from sulphuric acid and then to the action of heat in order to drive out liquid held in suspension, continuing the heating process until the plates are entirely melted. The material thus recovered is then ground and formed into a paste with commercial red lead and dilute sulphuric acid. Another method for utilizing recovered active material, which has gone into some commercial use, has comprised grinding the sulphated active material from old worn out battery plates, mixing it into a paste with dilute acetic acid and applying the paste to supporting grids. Great difficulties have been encountered in the production of satisfactory battery plates by this process, due to the fact that the acetic acid used in the pasting solution attacks the grids and the excess of sulphates and other impurities in the old active material are such as to greatly reduce its capacity for holding a "charge" and causes the plates to "shed" or disintegrate.

I have discovered that impure active material, such as sulphated materials recovered from old worn out batteries, whether "positive" active material or "negative" active material, may be formed into a paste and applied to a supporting grid, the same as is done with new active material, and purified electrolytically after such application. In carrying out my improved process, I have found that all foreign materials, including acids used in the pasting solution, are thrown out from the active materials of a plate so treated, or combine with the evolved hydrogen incident to the process, leaving nothing but pure active material on the supporting grid. The purified material is then pressed into its supporting grid to set it firmly into its support and retard its rate of oxidation when dried preparatory to the forming operation. A plate so treated may then be "formed" in the usual manner and will have a longer useful life than if it had been made from pure active materials produced by a smelting process and will have a higher capacity.

In the description of the method of carrying out my invention, which is to follow, I shall refer particularly to the employment of materials recovered from used battery plates as my invention will apparently have its greatest field of usefulness in connection with such material. It will be obvious, however, that it would be equally applicable to purifying active material containing less impurities than those recovered from old battery plates. Active materials recovered from used plates, besides containing an excess of lead sulphate, contain copper sulphate which is carried down into the battery from the sulphated copper terminals usually employed, and also contains more or less iron and other impurities. These impurities, if allowed to remain in the active material, render it unreliable for the manufacture of new battery plates. Furthermore, the binding medium necessarily employed with such material is of a nature which attacks lead. The principal object of my invention, therefore, is to provide a method of manufacture whereby all such impurities may be removed from the active materials before placing the plate in a finished battery.

In carrying out my invention, I take old discarded battery plates and divide the positive plates from the negative. The active material of such discarded plates is separated from its supporting grids by any suitable means, such as by a tumbler, by washing, or other suitable separator, and the materials are sifted. The sifted material is then formed into separate "positive" and "negative" batches of paste, preferably by mixing with a solution of sodium acetate, though a weak solution of acetic acid might be used. I prefer to use the sodium acetate because it is more readily separable from the material in the purification step of my process, and further, because it has a less detrimental effect on the metallic lead support. The active materials recovered from old positive plates is used to make the paste for the new positive plates and the recovered negative material for negative plates. While a small percentage of positive material may be used in making the negative plates, the paste for the positive plates should not be mixed with recovered negative material. If insufficient recovered positive material is at hand, the deficiency should be made up with red lead. In making the pasting solution, for positive plates, I mix 1 pound of sodium acetate to 5 gallons, or 40 pounds, of water, making a solution of about $2\frac{1}{2}\%$. In making a paste for negative plates, a solution of only about $\frac{1}{2}$ the strength, or a $1\frac{1}{4}\%$ solution of sodium acetate, is necessary.

The paste is then applied to metallic lead supports or grids, such as are commonly used and are allowed to dry for some six to twelve hours, or until they are self-supporting and do not stick together.

When the plates are fashioned as has just been described, they are placed in electrolytic cells, or forming tanks with dummies of metallic lead, the tank being filled with water. The pasted plates are connected together to form the cathode element of the cell, while the metallic dummies form the anode. It will be noted that in this particular part of my process, the plates are not thoroughly dried out, as is the common practice in forming new plates, and furthermore the plates, whether positive or negative, are always connected as the cathode, or negative side of the circuit. It is necessary, however, that the negative plates and positive plates be treated in separate tanks, for the reason that the negative plates require less electric energy for purification than do the positive plates.

The electric current is allowed to pass through the tank in the manner described until all foreign material in the paste is thrown out or combines chemically with the evolved hydrogen at the cathode, leaving behind pure active material. The current required for accomplishing this part of the process may vary somewhat, but I have found that, with 16 positive plates in a forming tank with the appropriate number of dummies, a charging rate of 70 amperes for about 15 hours is required. For negative plates a charging rate of only approximately $\frac{1}{2}$ that required for the positive plates is necessary. In other words, a tank containing 32 negative plates, with the appropriate dummies, could be purified with the same amount of current employed in purifying 16 positive plates. In this part of the process, the lead paste is electrolytically purified and all sulphate, iron or other impurities, together with the sodium acetate binder is removed.

While I use only water in the forming tank in which the freshly pasted plates are placed, the action of the electric current in causing the sulphate, acetate, etc., to be thrown out from the old material, soon renders the water acid. In some instances I have found that with plates made from heavily sulphated old material, the bath at the end of the purification step will have a specific gravity of around 1.150. It will be seen therefore that my process could possibly be accomplished by using a weak acid solution, though this is not at all necessary and I have found that pure water is preferable.

When the plates thus treated and purified are removed from the purification tank the paste thereon is highly porous but loosely held in the grids. Unless proper precautions are taken, it oxidizes so rapidly upon exposure to the air as to overheat and turn to a state of litharge. In order to prevent this, and to compact the paste in the grids, I immediately submit the plates to pressure, for example, by passing them between rollers, to compress the spongy lead paste until it is compacted and firmly set in the grids, in which condition the rate of oxidation is reduced. The plates may then be dried in the open air, in the usual manner. The drying process usually requires from 24 to 48 hours, better results being accomplished by a longer drying period.

When the plates are thoroughly dried they are assembled in battery groups and given a regular forming charge in a dilute sulphuric acid solution having a specific gravity of about 1.100. In this charge, the positive plates form the anode elements and the negative plates the cathode. After being given the forming charge, they are placed in permanent cells with a sulphuric acid solution of the required strength, or about 1.360 specific gravity, when they are ready for the final charge and use.

From the foregoing it will be apparent that I have devised a process for manufacturing secondary battery plates and utilizing therefor sulphated active material recovered from discarded used batteries, by means of which reliable battery plates are produced, capable of a longer useful life than those produced from new active material.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a process of making battery plates from sulphated active material, the steps which comprise forming a paste by mixing the material with a dilute solution of sodium acetate, applying the paste to supporting grids, and removing the sulphates and acetate from the paste before the forming operation.

2. In a process of making battery plates from sulphated active material, the steps which comprise forming a paste by mixing the material with a dilute solution of sodium acetate, applying the paste to supporting grids, removing the sulphates and acetate from the paste, compressing the paste into the grids, and forming the plates thus fashioned.

3. In a process of making secondary battery plates from active material recovered from used batteries, the steps which comprise separating the active material according to its previous use into positive and negative material, forming separate batches of paste from the positive material and the negative material, applying the paste from the separate batches to separate supporting grids, electrolytically purifying the paste on the grids in separate positive and negative groups, compressing the purified pasted grids to bring the paste into firm engagement with its supports and to retard its rate of oxidation when exposed to the air, and drying the plates so fashioned.

4. In a process of making secondary battery plates from active materials recovered from used batteries, the steps which comprise dividing the old material according to its previous use into positive and negative material, mixing the separate batches of material with a weak solution of sodium acetate to form paste, applying the paste from the separate batches to separate supporting grids, assembling the pasted grids in separate positive and negative groups, employing said groups as cathode elements in separate electrolytic cells until the paste on said grids is purified, compressing the grids thus treated to firmly engage the paste with the grids and to minimize oxidation when exposed to the air, and drying the plates thus fashioned.

In testimony whereof I FRANK GARACA, affix my signature.

FRANK GARACA.